(12) United States Patent
Heise

(10) Patent No.: US 6,661,894 B1
(45) Date of Patent: Dec. 9, 2003

(54) CIRCUIT CONFIGURATION AND CHIP SET FOR SUPPLYING A TELEPHONE SUBSCRIBER LOOP WITH A SUPPLY VOLTAGE AND NETWORK-SIDE TERMINAL OF A TELEPHONE SUBSCRIBER LOOP

(75) Inventor: Bernd Heise, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/429,838

(22) Filed: Oct. 29, 1999

(30) Foreign Application Priority Data

Oct. 29, 1998 (EP) .............................................. 98120504

(51) Int. Cl.⁷ ............................ H04M 1/00; H04M 9/00
(52) U.S. Cl. ............. 379/399.01; 379/413; 379/413.01; 379/412; 379/413.02
(58) Field of Search ...................... 379/399.01, 399.02, 379/402, 404, 412, 413, 413.01, 413.02

(56) References Cited

U.S. PATENT DOCUMENTS 4,734,937 A * 3/1988 Schmid ....................... 379/253
5,661,794 A   8/1997 Rosch
6,553,117 B1 * 4/2003 Armistead et al. .......... 379/398

FOREIGN PATENT DOCUMENTS

EP         0663755 A1      7/1995

OTHER PUBLICATIONS

"A Two-Chip Set for SLIC", Yasunobu Inabe et al., Review of the Electrical Communications Lab. 36, No. 6, Tokyo, Nov. 1988, pp. 561–565.

* cited by examiner

Primary Examiner—Rexford Barnie
(74) Attorney, Agent, or Firm—Laurence A. Greenberg; Werner H. Stemer; Gregory L. Mayback

(57) ABSTRACT

A circuit configuration is provided for supplying a telephone subscriber loop with a supply voltage, for transmitting a transmitted signal into the telephone subscriber loop, and for receiving a received signal from the telephone subscriber loop. The telephone subscriber loop has a first line and a second line. The circuit configuration has a supply voltage source with a first terminal and a second terminal between which a supply voltage drops; a first circuit connected with the first line and having first and second supply voltage connections; and a second circuit connected with the second line and having third and fourth supply voltage connections. The first supply voltage connection is connected with the first terminal and the fourth supply voltage connection is connected with the second terminal. A network-side terminal of a telephone subscriber loop and a chip set are also provided.

20 Claims, 3 Drawing Sheets

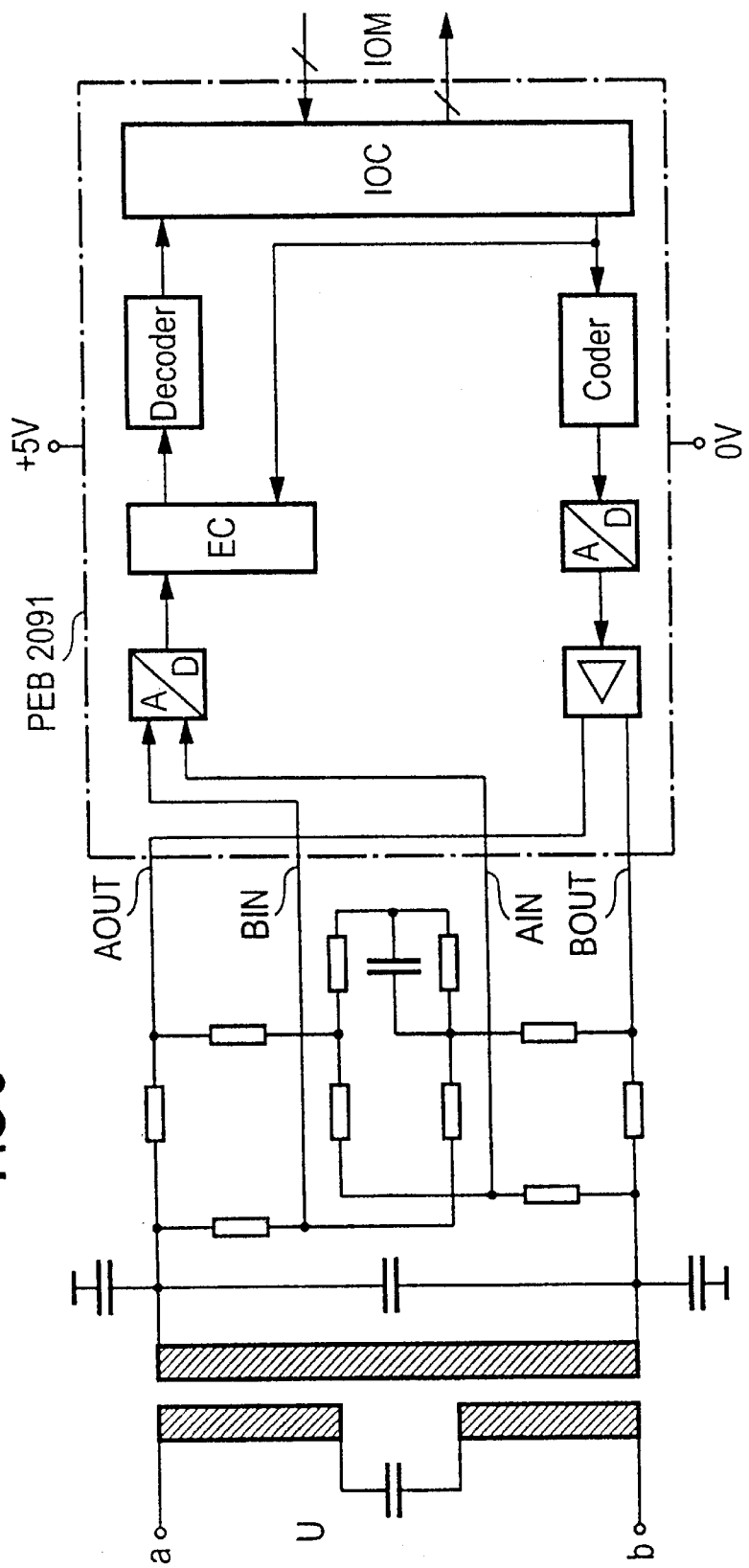

CIRCUIT CONFIGURATION AND CHIP SET FOR SUPPLYING A TELEPHONE SUBSCRIBER LOOP WITH A SUPPLY VOLTAGE AND NETWORK-SIDE TERMINAL OF A TELEPHONE SUBSCRIBER LOOP

BACKGROUND OF THE INVENTION

Field of the Invention

The invention relates to a circuit configuration for supplying a telephone subscriber loop with a supply voltage, for transmitting a transmitted signal into the telephone subscriber loop, and for receiving a received signal from the telephone subscriber loop. The invention also relates to a network-side terminal of a telephone subscriber loop having the circuit configuration. The invention furthermore relates to a chip set for supplying a telephone subscriber loop with a supply voltage, for transmitting a transmitted signal into the telephone subscriber loop and for receiving a received signal from the telephone subscriber loop.

A known configuration with which it is possible to supply an ISDN subscriber loop by wiring a semiconductor component, is described below and illustrated in FIG. 3.

A circuit configuration for supplying a subscriber line is known from European Patent Application 0 663 755 A1. That circuit configuration is suitable in a particularly beneficial way for conventional analog subscriber lines. A transfer of that supply concept to ISDN subscriber lines presents problems because of unacceptable power losses generated by that circuit configuration, which does not include a transformer. In the case of an analog subscriber line, an operating time of 1% is assumed, during which it is necessary to supply the subscriber line. In contrast, an operating time of 40% is assumed for ISDN subscriber lines, during which a complete supply of the subscriber line is necessary. In the case of an ISDN telephone subscriber line the supply voltage must also be applied outside the operating time in order to supply the subscriber's network terminal NT with energy in the quiescent mode. Due to analog technology that is used, a fluctuating supply voltage on an analog subscriber line is not critical for the functioning of the total system. However, in the case of an ISDN subscriber line, the connection is broken if the supply to the subscriber's network terminal NT falls below a minimum value. The circuit configuration in European Patent Application 0 663 755 is not suitable for use at an ISDN subscriber line because of a high power loss.

SUMMARY OF THE INVENTION

It is accordingly an object of the invention to provide a circuit configuration and a chip set for supplying a telephone subscriber loop with a supply voltage and a network-side terminal of a telephone subscriber loop, which overcome the hereinafore-mentioned disadvantages of the heretofore-known devices of this general type and which require as few complex discrete components as possible and thereby guarantee a low power loss.

With the foregoing and other objects in view there is provided, in accordance with the invention, a circuit configuration for supplying a telephone subscriber loop having first and second lines or ends with a supply voltage, for transmitting a transmitted signal into the telephone subscriber loop, and for receiving a received signal from the telephone subscriber loop, the circuit configuration comprising a power supply voltage source having a first terminal and a second terminal across which a supply voltage drops or is applied; a first circuit connected to the first line, the first circuit having first and second supply voltage connections; and a second circuit connected to the second line, the second circuit having third and fourth supply voltage connections; the first supply voltage connection connected to the first terminal of the supply voltage source and the fourth supply voltage connection connected to the second terminal of the supply voltage source.

The advantage of this circuit configuration is that through an appropriate choice of the supply voltage and of the supply voltages of the first and second circuit, on one hand a pre-defined battery voltage can be guaranteed between the ends of the telephone subscriber loop, and on the other hand a wanted or desired signal of the subscriber loop can be applied over the first and second circuits in the range of their supply voltages and can be injected from the subscriber loop. The circuit does not require a transformer for this purpose. The power loss in the first and second circuits is reduced to a minimum because voltage drops generating losses are not oriented on the level of the supply voltage source but rather on the level of the supply voltages of the first and second circuits.

In accordance with another feature of the invention, the voltage between the first and the second supply voltage connections and the voltage between the third and the fourth supply voltage connections of the respective first and second circuits are chosen to be substantially lower than the voltage of the supply voltage. The choice of an especially small supply voltage for the first and second circuits can reduce the power loss of the circuit configuration to a minimum.

In accordance with a further feature of the invention, the first and second circuits each have an output driver circuit which is connected with the respective first and second ends of the subscriber loop. In this way it is possible to apply a wanted signal to the subscriber loop.

In accordance with an added feature of the invention, the first and second circuits also each have a current measuring device which measures the current at the respective first and second ends of the subscriber loop and report the values obtained. In this way a wanted signal can be decoupled from the subscriber loop.

In accordance with a further feature of the invention, the first and second circuits each supply a control signal for controlling the current at the first end and at the second end of the subscriber loop. This signal can be used to control a circuit for limiting overcurrent.

In accordance with an added feature of the invention, the first and second circuits respectively supply a first and a second input signal which correspond to the received signal from the subscriber line, and respectively receive a first and a second output signal which correspond to the transmitted signal in the subscriber line. In this way both the first and the second circuits provide a two-wire to four-wire conversion of the signals. The first and the second input signals and the first and the second output signals thus correspond to the wanted signals on the subscriber loop in the receiving direction, i.e. from the subscriber loop to the circuit configuration, and in the transmitting direction, i.e. from the circuit configuration to the subscriber loop.

In accordance with an additional feature of the invention, the first and second input signals and the first and second output signals are digital signals.

In accordance with yet another feature of the invention, the signals are generated through appropriate analog/digital converters and digital/analog converters in the first and second circuits. The use of digital signals has the advantage that they are easier to regenerate and thus the effect of interference can be minimized.

In accordance with yet a further feature of the invention, the first circuit and the second circuit are laid out identically. This has the advantage that it is only necessary to construct a single circuit which is then suitable for both the first and the second circuits. Similar advantages arise in the fabrication and in the use of the first and the second circuits in a circuit configuration according to the invention.

In accordance with yet an added feature of the invention, there is provided a third circuit which is connected with the first circuit and the second circuit in a dc decoupled way. In this configuration the third circuit provides the output signals and processes the arriving input signals. The dc decoupling has the advantage of permitting the third circuit to be operated at voltage levels which are independent of the voltage levels of the first and second circuits.

In accordance with yet an additional feature of the invention, the dc decoupled connection between the first circuit and the third circuit and between the second circuit and the third circuit is implemented through capacitors. Compared with the alternative of a transformer, capacitors used as dc decoupling elements have the advantage of being cheaper to fabricate with relatively high precision and having a smaller size in the necessary dimensioning range.

In accordance with again another feature of the invention, the third circuit has a control device which controls the first, second and third circuits.

In accordance with again a further feature of the invention, the first and second circuits are controlled through time-division multiplexing of a control signal in the first and second output signals.

In accordance with again an added feature of the invention, the third circuit has an echo compensator.

In accordance with again an additional feature of the invention, the third circuit has a coding circuit for coding the output signals.

In accordance with still another feature of the invention, the control device of the third circuit performs operating point control of the circuit elements in order to achieve a linear transmitted signal on the subscriber loop in the event of changing current consumption.

With the objects of the invention in view the circuit configuration of the invention is especially suitable for telephone subscriber loops of the ISDN (integrated services digital network). It is particularly suitable for the line codes 2B1Q, 4B3D and Up0. The circuit configuration is similarly suitable for an ISDN S-interface. Finally, the circuit configuration can be used to particular advantage for the connection of a telephone subscriber loop in the case of ADSL (asynchronous digital subscriber line), MDSL (multirate digital subscriber line), HDSL (high bit rate digital subscriber line), SDSL (single pair or symmetric digital subscriber line) and VDSL (very high bit rate digital subscriber line).

With the objects of the invention in view there is also provided a chip set for supplying a telephone subscriber loop having first and second lines with a supply voltage, for transmitting a transmitted signal into the telephone subscriber loop and for receiving a received signal from the telephone subscriber loop, the chip set comprising a first chip to be connected to the first line, the first chip supplying a first input signal and receiving a first output signal of the first line; and a second chip to be connected to the second line, the second chip supplying a second input signal and receiving a second output signal from the second line; the first and second chips being identical and requiring a supply voltage substantially lower than the power supply voltage supplied to the telephone subscriber loop. A chip set of this kind enables low-cost provision of a line termination for a telephone subscriber loop.

In accordance with another feature of the invention, a third chip receives the first and the second input signals and supplies the first and the second output signals.

It is advantageous for the input and output signals to be pre-processed in the third chip. For this purpose, in accordance with a further feature of the invention, the third chip has an echo compensator which deletes the echo of the transmitter on the subscriber loop.

In accordance with a concomitant feature of the invention, the third chip has an input/output device for a PCM bus.

Other features which are considered as characteristic for the invention are set forth in the appended claims.

Although the invention is illustrated and described herein as embodied in a circuit configuration and a chip set for supplying a telephone subscriber loop with a supply voltage and a network-side terminal of a telephone subscriber loop, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a schematic and block diagram of a circuit configuration according to the state of the art.

DESCRIPTION OF THE PREFERRED EMBODIMENTS

Referring now to the figures of the drawings in detail and first, particularly, to FIG. 3 thereof, there is seen a known configuration with which it is possible to supply an ISDN subscriber loop a, b by wiring a semiconductor component that is obtainable from the firm Siemens AG under a designation PEB 2091. Although a voltage of over 100 V must be provided at ends a, b of the subscriber loop, the semiconductor component PEB 2091 is driven with the usual operating voltage of approximately 5 V. For this purpose the voltage is applied to a primary winding of a transformer, while wanted signals of the subscriber loop are injected and decoupled at a secondary winding. A termination hybrid which is provided at the secondary side of the transformer processes bi-directional signals on the subscriber loop into directionally separated signals on signal lines AIN, BIN and AOUT, BOUT. The signal lines AIN, BIN and AOUT, BOUT are connected with appropriate terminals of the semiconductor component PEB 2091 to enable the signals to be processed therein. As seen in the receive direction starting from the input lines AIN, BIN, the semiconductor component includes an analog/digital converter A/D, an echo compensator EC, a decoder and an input/output device IOC. In the reverse direction, the transmitted signals travel from the input/output device IOC to a decoder, through a digital/analog converter and through an output buffer onto the output lines AOUT and BOUT. The transmitted signals are applied to the subscriber loop a, b over the transformer and the received signals are injected over the transformer. The disadvantage of that configuration is the complicated transformer which must be constructed with high precision in order to guarantee reliable injection and decoupling of the signals.

Figure 1:
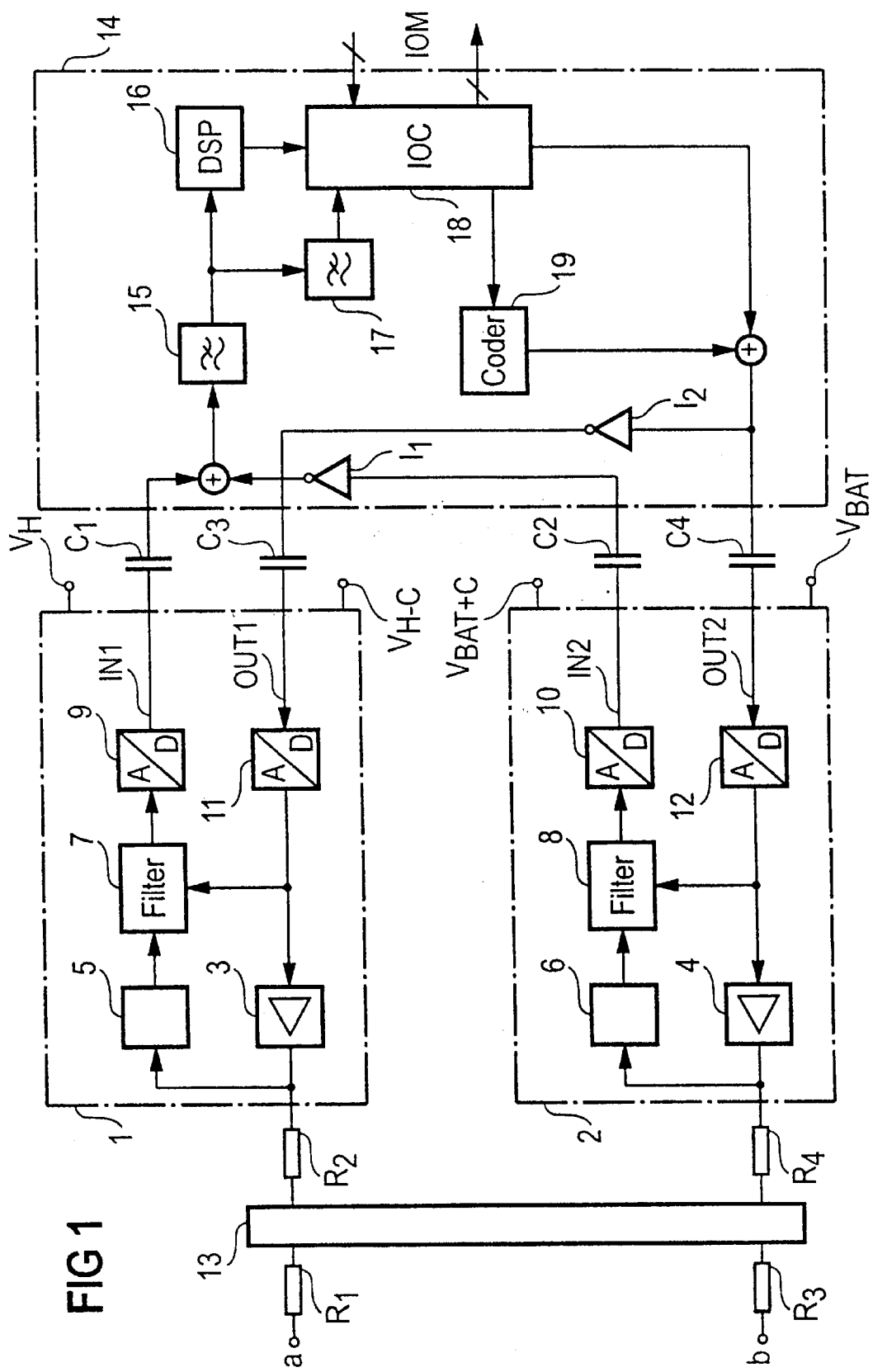
FIG. 1 is a schematic and block diagram of a first exemplary embodiment of a circuit configuration of the invention.

FIG. 1 shows a first exemplary embodiment of the invention. Ends a and b of lines of a telephone subscriber loop are connected through respective resistors R1 and R3, through an overcurrent protective circuit 13 and through respective resistors R2 and R4, with first and second circuits or chips 1 and 2 of a line termination circuit or chip set. A directional separation of signals on the subscriber loop is carried out in each of the circuits 1 and 2. Thus signals directed from the subscriber loop to the line termination circuit are issued by the circuits 1 and 2 as respective digital output signals IN1 and IN2. In the reverse direction, the circuits 1 and 2 receive respective digital input signals OUT1 and OUT2 in order to inject them into the subscriber loop as transmitted signals from the line termination circuit to the subscriber loop.

The circuit 1 has an output buffer or output driver circuit 3 on the subscriber loop side which applies a voltage through the resistors R2 and R1 to the end a of the subscriber loop. The circuit 1 also has a current measuring device 5 which measures current at a connecting point between the end a of the subscriber loop and the circuit 1. A measured value of the current contains a signal to be injected from the subscriber loop. That signal is superimposed on a signal applied by the output buffer 3. A value of the current determined by the current measuring device 5 is fed to a filter 7 in which the transmitted signal fed to the output buffer 3 is subtracted. An output signal of the filter 7 is fed to an analog/digital converter 9 which generates the digital output signal IN1 from that output signal. The transmitted signal to be applied to the subscriber loop is received by the circuit 1 as the digital input signal OUT1, in order to be fed through a digital/analog converter 11 as an analog signal to the output buffer 3 and the filter 7.

The layout and function of the circuit 2 are identical with the layout and function of the circuit 1 as described above. In this case an output buffer or output driver circuit 4 is connected through the resistor R4 and the resistor R3 with the end b of the telephone subscriber line. A current measuring device 6 measures a current at the end b of the subscriber loop and delivers a value obtained to a filter 8. An output signal of the filter 8 is fed to an analog/digital converter 10 which generates the digital output signal IN2 from that output signal. In the reverse transmission direction, a digital/analog converter 12 forms a signal from a digital input signal OUT2 which is to be applied through the output buffer 4 to the subscriber loop. In the exemplary embodiment shown, the filters 7 and 8, the analog/digital converters 9 and 10, and the digital/analog converters 11 and 12 are each realized as a switched mode capacitance network. The switched mode capacitance networks in the circuits 1 and 2 are each controlled by a common or joint clock signal.

The first circuit 1 has first and second supply voltage connections $V_H$ and $V_{H-C}$ and the second circuit 2 has third and fourth supply voltage connections $V_{BAT+C}$ and $V_{BAT}$.

Reference symbol $V_H$ also represents a first terminal and reference symbol $V_{BAT}$ also represents a second terminal of a supply voltage source across which a supply voltage $V_H$–$V_{BAT}$ drops. A potential difference between $V_H$ and $V_{H-C}$ and a potential difference between $V_{BAT+C}$ and $V_{BAT}$ is $V_C$ in both cases. The potential difference $V_C$ can be up to 6 volt and thus lies within a normal range of supply voltages for CMOS semiconductor components. A potential difference between $V_H$ and $V_{BAT}$ is approximately 110 volts. Since the output buffer 3 delivers a voltage between $V_H$ and $V_{H-C}$ and the output buffer 4 delivers a voltage between $V_{BAT+C}$ and $V_{BAT}$ there is a voltage across the output terminals of the output buffers 3 and 4 which can be a maximum of $V_H$–$V_{BAT}$ and a minimum of $V_H$–$V_{BAT}$–2 $V_C$. Demands on the supply to a telephone subscriber loop can be met through appropriate dimensioning of $V_H$, $V_{BAT}$ and $V_C$.

The lines carrying the signals IN1, OUT1 and IN2, OUT2 of the respective first and second circuits 1 and 2 are connected through capacitors C1, C2, C3 and C4 with a third digital circuit or chip 14. On one side, the signal IN1 is fed by the circuit 1 through the capacitor C1 to a summation element having an output signal which is fed to a digital low-pass filter 15 of a received signal configuration of the circuit 14. On the other side, the signal IN2 is fed by the circuit 2 through the capacitor C2 and an inverter $I_1$ to the summation element. The inverter $I_1$ ensures that the wanted signal received from the subscriber line is constructively superimposed at the summation element. The signal OUT1 is received by the circuit 1 through the capacitor C3 and an inverter $I_2$ of a transmitted signal configuration of the circuit 14. The signal OUT2 is received by the circuit 2 through the capacitor C4 of the transmitted signal configuration of the circuit 14. The inverter $I_2$ ensures that the output buffers 3 and 4 in the circuits 1 and 2 respectively operate in an opposed push-pull mode.

The transmitted signal configuration of the circuit 14 includes an input/output control device 18, a line coder 19 and a summation element. On one side, a control signal to be transmitted is transferred by the control device 18 to the line coder 19, which feeds the coded signal to the summation element. In the exemplary embodiment the coder 19 feeds a 2B1Q code (2 bits produce a quaternary symbol) in accordance with the ISDN rules. On the other side, a signal is fed through the control device to the summation element. That signal enables the operating points of the components of the circuit configuration to be controlled in the case of changing load conditions at a network terminal of a remote subscriber.

The received signal configuration of the circuit 14 includes the filter 15, a digital signal processing device 16, a further low-pass filter 17 and the control device 18. The signal processing device 16 performs the function of an echo compensator and a line coding device. The separate filter 17 serves to determine a direct current component on the subscriber loop. A result is fed to the control device 18 for further processing. The control device receives the signals to be transmitted in the subscriber loop and transmits the signals received by the subscriber loop over an IOM (ISDN oriented modular) bus system, which is adequately known in ISDN technology.

As a result of the dc decoupling which the capacitors C1 to C4 guarantee between the circuits 1 and 2 on one hand, and the circuit 14 on the other hand, the circuit 14 can be driven with supply voltage levels which are independent of the supply voltage levels of the circuits 1 and 2. Preferably, a supply voltage level is chosen which corresponds to those of normal CMOS semiconductor components.

Figure 2:
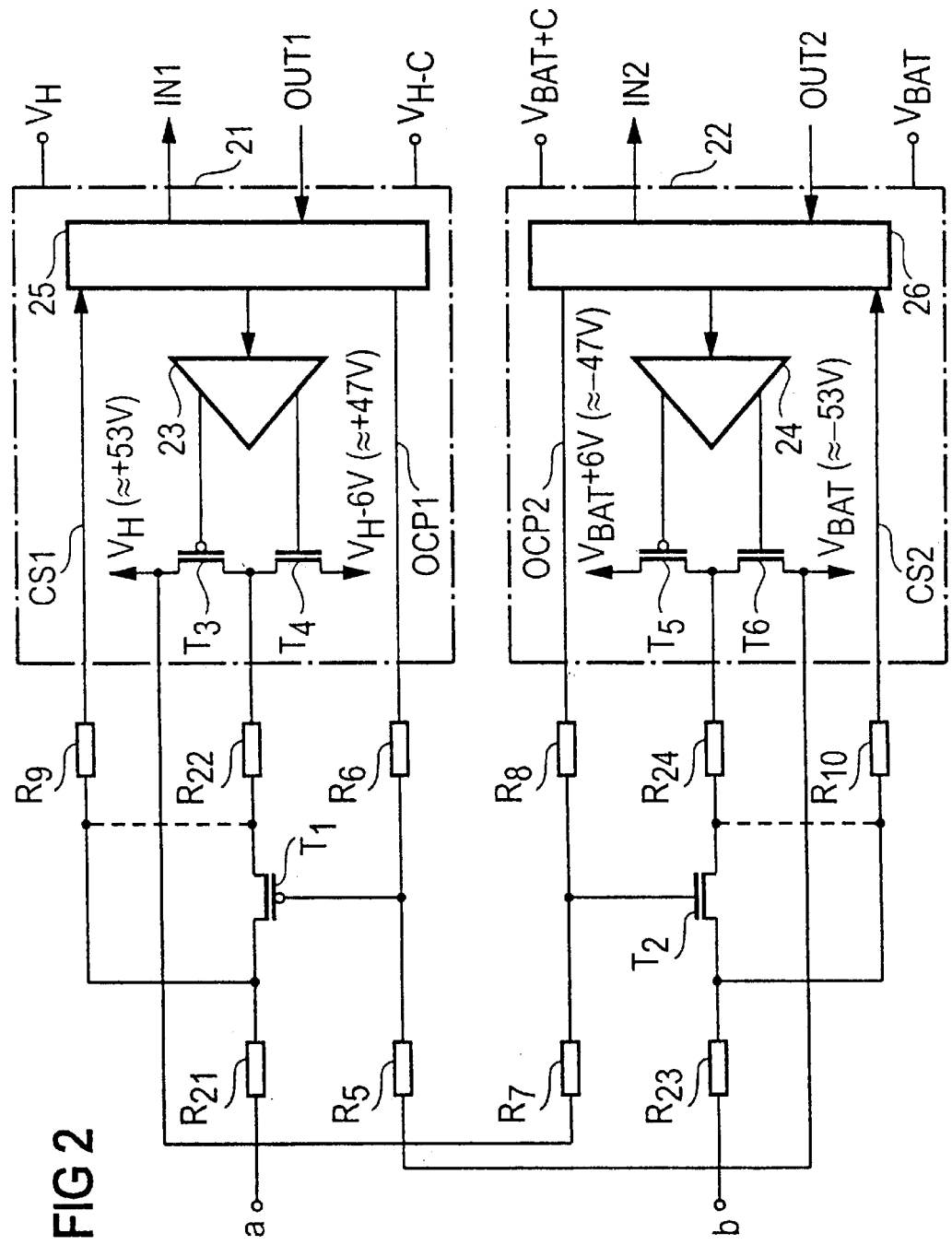
FIG. 2 is a schematic and block diagram of a second exemplary embodiment of the circuit configuration of the invention.

FIG. 2 shows a second exemplary embodiment of the invention. FIG. 2 contains circuits 21 and 22 which respectively correspond to the circuits 1 and 2 of the exemplary embodiment shown in FIG. 1. In this case, a circuit block 25 of the circuit 21 essentially performs functions which are implemented in the exemplary embodiment of FIG. 1 by the filter 7, the analog/digital converter 9 and the digital/analog converter 11. An operational amplifier 23 with common mode output signals controls transistors $T_3$ and $T_4$ at which an output signal can be tapped. This essentially corresponds to the functionality of the output buffer 3 in the exemplary embodiment of FIG. 1. In a similar way, the circuit 22 has a circuit block 26 which essentially corresponds to the filter 8, the analog/digital converter 10 and the digital/analog converter 12 in the exemplary embodiment of FIG. 1. An operational amplifier 24 has common mode outputs which are connected with a transistor configuration formed of transistors $T_5$ and $T_6$. The operational amplifier 24 together with the transistor configuration $T_5$ and $T_6$ provide a functionality which essentially corresponds to the output buffer 4 in the exemplary embodiment of FIG. 1.

On one side, an output terminal of the transistor configuration $T_3$, $T_4$ is connected through a resistor $R_{22}$, a load section of a transistor $T_1$ and a resistor $R_{21}$ with the end a of the subscriber loop. On the other side, an output terminal of the transistor configuration $T_5$, $T_6$ is connected through a resistor $R_{24}$, a load section of a transistor $T_2$ and a resistor $R_{23}$ with the end b of the subscriber loop. A current measurement at the end a of the subscriber loop is carried out by a signal CS1 (current sensing) through a resistor $R_9$ by tapping at a node between the load section of the transistor $T_1$ and the resistor $R_{21}$. As an alternative to this, the tap can be made at a node between the load section of the transistor $T_1$ and the resistor $R_{22}$, as is indicated in FIG. 2 with a dashed line. A current measurement at the end b of the subscriber loop is carried out through the use of a signal CS2 through a resistor $R_{10}$ by tapping at a node between the load section of the transistor $T_2$ and the resistor $R_{23}$. As an alternative to this, the tap can be made at a node between the load section of the transistor $T_2$ and the resistor $R_{24}$, as is indicated in FIG. 2 with a dashed line. The signals CS1 and CS2 are fed for further processing to the respective circuit blocks 25 and 26 in the respective circuits 21 and 22.

In FIG. 2 the load sections of the transistors $T_1$ and $T_2$ are controlled by respective signals OCP1 and OCP2 (overcurrent protection). The signals OCP1 and OCP2 are respectively issued by the circuit blocks 25 and 26 in the respective circuits 21 and 22. The signal OCP1 is fed through a resistor $R_6$ to a gate terminal of the transistor $T_1$ and the signal OCP2 is fed through a resistor $R_8$ to a gate terminal of the transistor $T_2$. On one side, the gate terminal of the transistor $T_1$ is also connected through a high-impedance resistor $R_5$ with the battery voltage $V_{BAT}$ of the end b of the subscriber line. On the other side, the gate terminal of the transistor $T_2$ is connected through a high-impedance resistor $R_7$ with the battery voltage $V_H$ of the end a of the subscriber loop. It is possible to ensure an overcurrent control on the subscriber loop through the use of the signals OCP1 and OCP2. The control proceeds through signals fed to the circuit blocks 25 and 26 by time-division multiplexing in the respective signals OUT1 and OUT2.

A circuit configuration for the subscriber line termination in an ISDN exchange (line card) must transmit on the subscriber loop both bi-directional data as well as a remote supply voltage to the subscriber's network terminal NT. For this purpose a dc supply voltage of up to 110 volt is applied between the two ends a and b of the subscriber loop. The data signals with levels of approximately 5 volts (peak-to-peak) are superimposed on this level. It must be possible to recognize the signals transmitted by the subscriber again.

High standards are set for the output and input stage for signal transmission with respect to linearity, suppressing the injection of intrinsic interference, common mode rejection and immunity against excess voltage and short circuit. Many line cards are installed in a control cabinet at the exchange. The permissible power consumption of the line card is therefore restricted to a minimum.

ISDN line cards which were realized up to now (see FIG. 3) separate the data transmission from the remote supply through the use of a transformer. The components for data transmission are integrated semiconductor components which are driven with supply voltages of approximately 5 volts. The concepts known from analog line cards cannot be simply transferred to ISDN line cards because different remote supply specifications apply for ISDN. The known concepts would result in an excessive power consumption. One reason for that is that in the case of analog line cards all signals from and to low-voltage circuits must overcome a high voltage difference. Even for relatively low currents, high power losses are generated because the working current always flows at the full battery voltage. At the same time, transistors controllable over a wide range are necessary in the high voltage circuits in order to meet the high linearity specifications for the output signal. The output signal must therefore have a relatively high voltage difference relative to the supply voltage which drives both the supply current and the signal current.

Instead of one high-voltage circuit, the invention proposes two low-voltage circuits which are driven at different voltage levels. The voltage difference thereby corresponds to the supply voltage of up to 110 volts. However, the supply voltage applied to each individual low voltage circuit is only up to 6 volts. It is therefore possible to use conventional semiconductor circuit techniques for the low-voltage circuits. Each low-voltage circuit drives one end of the subscriber loop. Overcurrent protection can be provided through external components.

The low-voltage circuits contain an output driver and a current sensor on the subscriber loop side. In a termination hybrid the transmitted signal component from the input current is attenuated as strongly as possible. The transmitted signal is generated from a digital signal. The actual signal processing and control is carried out in a digital circuit. Only digital signals are exchanged between the low-voltage circuits and the digital circuit. The high voltage differences between the low-voltage circuits and the digital circuit are bridged by surge-proof capacitors so that no signal currents fall away at the supply voltage. In this configuration the digital signals can be coded in such a way that they can overcome the isolation barrier of capacitors in a dc-free way.

The circuit configuration according to the invention has a power loss in the same range as that of the previous concepts using transformers. The high-voltage requirements are limited to a few discrete commercially available components which, for their part, can be controlled by the low-voltage circuits.

I claim:

1. In a circuit configuration for supplying a telephone subscriber loop having first and second lines with a supply voltage, for transmitting a transmitted signal into the telephone subscriber loop, and for receiving a received signal from the telephone subscriber loop, an improvement in the circuit configuration comprising:

a supply voltage source having a first terminal and a second terminal across which a supply voltage drops;

a first low-voltage circuit connected to the first line for driving said first line and for directional separation of received signals and transmitted signals on said first line, said first circuit having first and second supply voltage connections; and a second low-voltage circuit connected to the second line for driving said second line and for directional separation of received signals and transmitted signals on said second line, said second circuit having third and fourth supply voltage connections;

said first supply voltage connection of said first low-voltage circuit connected to said first terminal of said supply voltage source and said fourth supply voltage connection of said second low-voltage circuit connected to said second terminal of said supply voltage source;

wherein a voltage between said first and second supply voltage connections and a voltage between said third and fourth supply voltage connections are substantially smaller than the supply voltage.

2. The circuit configuration according to claim 1, wherein said first circuit has an output driver circuit connected to the first line, and said second circuit has an output driver circuit connected to the second line.

3. The circuit configuration according to claim 1, wherein said first circuit and said second circuit each have a current measuring device measuring current values on a respective one of the first and second lines and reporting the measured current values.

4. The circuit configuration according to claim 1, wherein said first and second circuits each supply a control signal for controlling a current on the first and second lines.

5. The circuit configuration according to claim 1, wherein said first and second circuits respectively supply first and second input signals corresponding to the received signal from the telephone subscriber line and respectively receive first and second output signals corresponding to the transmitted signal in the telephone subscriber line.

6. The circuit configuration according to claim 5, wherein the first and second input signals and the first and second output signal are digital signals.

7. The circuit configuration according to claim 5, wherein said first circuit has a first analog/digital converter for generating the first input signal and a first digital/analog converter for receiving the first output signal, and said second circuit has a second analog/digital converter for generating the second input signal and a second digital/analog converter for receiving the second output signal.

8. The circuit configuration according to claim 1, wherein said first circuit and said second circuit are constructed identically.

9. The circuit configuration according to claim 1, including a third circuit dc decoupled with said first circuit and said second circuit.

10. The circuit configuration according to claim 9, including capacitors dc decoupling said first circuit and said third circuit and dc decoupling said second circuit and said third circuit.

11. The circuit configuration according to claim 9, wherein said third circuit has a control device controlling said first, second and third circuits.

12. The circuit configuration according to claim 11, wherein said first and second circuits are controlled through time-division multiplexing in first and second output signals.

13. The circuit configuration according to claim 9, wherein said third circuit has an echo compensator.

14. The circuit configuration according to claim 12, wherein said third circuit has a coding circuit for coding the output signals.

15. The circuit configuration according to claim 11, including circuit elements, said control device of said third circuit effecting an operating point control of said circuit elements in the event of changing current consumption of a remote network terminal on the subscriber loop.

16. A network-side terminal of a telephone subscriber loop for ISDN with line codes 2B1Q, 4B3T, Up0, for an ISDN S-interface, for ADSL, MDSL, HDSL, SDSL, VDSL, comprising a circuit configuration according to claim 1.

17. In a chip set for supplying a telephone subscriber loop having first and second lines with a supply voltage, for transmitting a transmitted signal into the telephone subscriber loop and for receiving a received signal from the telephone subscriber loop, an improvement in the chip set comprising:

a first chip to be connected to the first line, said first chip supplying a first input signal and receiving a first output signal and separating said first input signal and said first output signal; and a second chip to be connected to the second line, said second chip supplying a second input signal and receiving a second output signal and separating said second input signal and said second output signal;

said first and second chips being identical and requiring a supply voltage substantially lower than the supply voltage supplied to the telephone subscriber loop.

18. The chip set according to claim 17, including a third chip receiving the first and second input signals and supplying the first and second output signals.

19. The chip set according to claim 18, wherein said third chip has an echo compensator.

20. The chip set according to claim 18, wherein said third chip has an input/output device for a PCM bus.

* * * * *